F. C. URSBRUCK.
TYPE WRITING MACHINE.
APPLICATION FILED JAN. 28, 1914.
1,156,331. Patented Oct. 12, 1915.
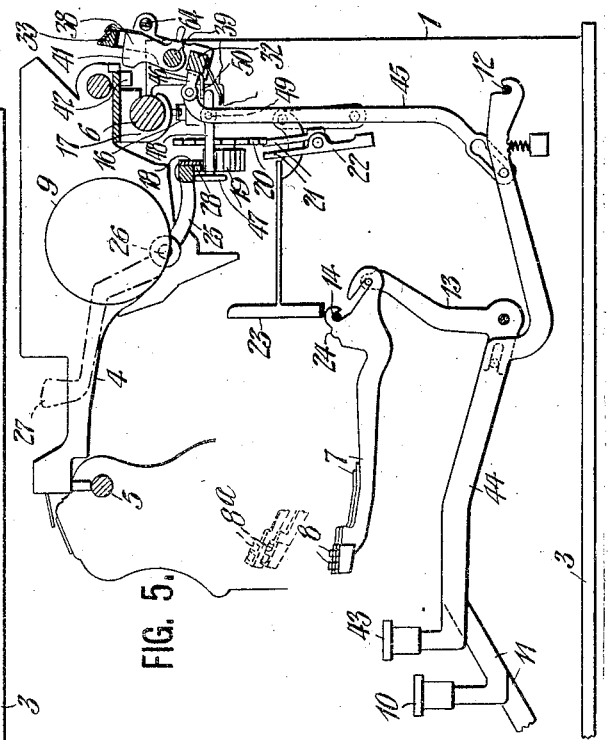
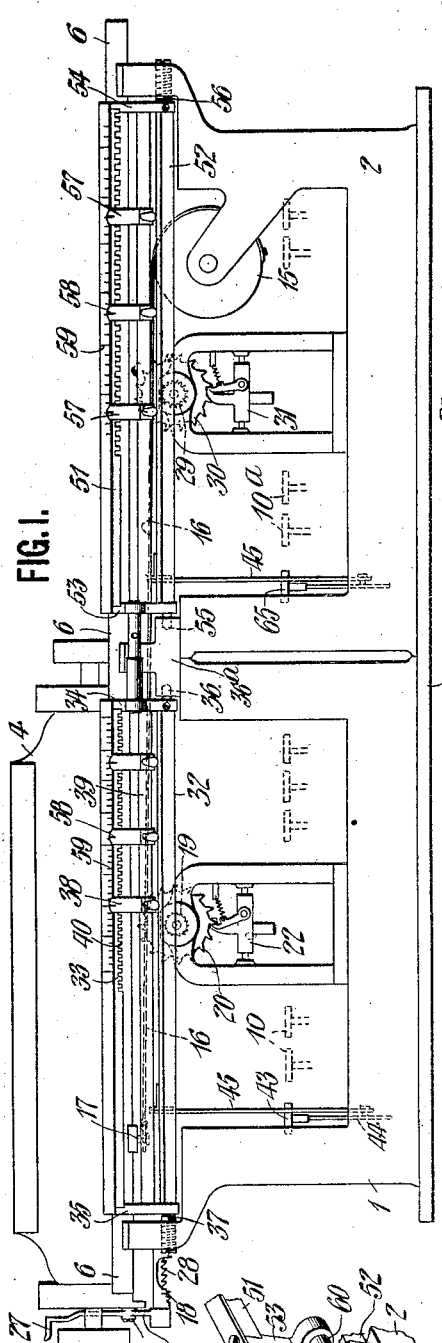
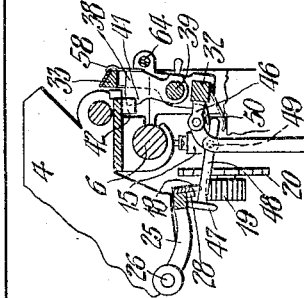
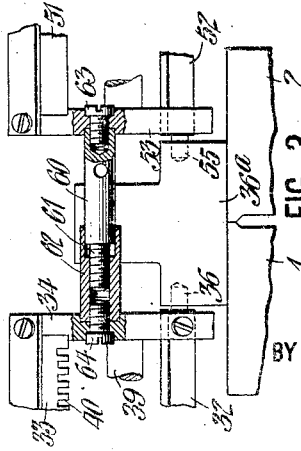
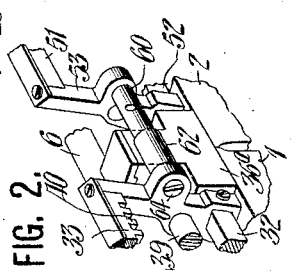
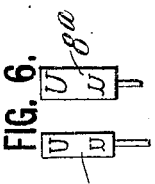
INVENTOR:
Frank C Ursbruck
BY R L Stickney
ATTORNEY
WITNESSES:
F. E. Alexander
W. C. Westphal

UNITED STATES PATENT OFFICE.

FRANK C. URSBRUCK, OF NEW YORK, N. Y., ASSIGNOR TO UNDERWOOD TYPEWRITER COMPANY, OF NEW YORK, N. Y., A CORPORATION OF DELAWARE.

TYPE-WRITING MACHINE.

1,156,331.    Specification of Letters Patent.    Patented Oct. 12, 1915.

Application filed January 28, 1914. Serial No. 814,858.

*To all whom it may concern:*

Be it known that I, FRANK C. URSBRUCK, a citizen of the United States, residing in New York city, in the county of New York and State of New York, have invented certain new and useful Improvements in Type-Writing Machines, of which the following is a specification.

My invention relates to typewriting machines, in which a traveling carriage is shiftable into coöperative relation to either one of a plurality of sets of type-bars, and the invention relates particularly to mechanism adapted for tabulator work with either type set alone or for shifting the carriage from its position into coöperative relation to one type set to a predetermined position in relation to another type set.

In my co-pending application, Serial Number 810,712, I have shown two machine frames placed side by side, each comprising a complete type system and a traveling carriage mounted to travel on a track extending the full length of the two machines, whereby the carriage may have a letter-feed movement in coöperation with either type system, and may also be moved from one type system to the other.

The present invention may be combined with a machine as above described, and may comprise a swinging rack on each frame, said racks each provided with tabulator stops adjustable along the racks to different columnar positions, said stops movable with the rack into the path of the carriage to stop the latter in the positions for which the stops are set. Either rack may be actuated by a key which swings the stops into operative position, the movement of the rack serving to release the carriage from its escapement mechanism and permitting it to run forward until arrested by a stop.

In order that the carriage may be shifted from one type system to the other by the operation of a tabulator key and stopped at any desired position, the racks on the two frames may be connected to swing as a unit when a tabulator key is depressed, whereby the carriage is held free from the escapement devices of both type systems and a free run of the carriage permitted, until arrested by a stop. The types of one set may be larger than those of the other set, or may differ from them in other respects, as disclosed in the co-pending application above referred to, and in accordance with the present invention, one or more columns or vertical sections of the work-sheet may be written with one set of types, and other portions with the other set, as the carriage may be moved by operating a shift key, from one type zone and column position to the other type zone and a new column position.

Other features and advantages will hereinafter appear.

In the accompanying drawings, Figure 1 is a rear elevation view of a machine embodying the principles of my invention. Fig. 2 is a detail perspective view of the means for connecting the two rack frames. Fig. 3 is a part sectional rear elevation view of the same. Fig. 4 is a sectional elevation of a swinging rack frame and escapement mechanism, the parts being in the position assumed when a tabulator key is depressed. Fig. 5 is a similar view, but with the tabulator key released and the parts in their normal position of rest. Fig. 6 is a detail view showing different sized types.

The two machine frames 1 and 2 may be mounted side by side on a base 3, the frames shown being those of the Underwood typewriting machine. A paper carriage is mounted to travel on front and rear rails 5 and 6 which may extend from the outer end of one frame to the outer end of the other frame whereby the carriage may be moved from one frame to the other. Mounted on each frame is a type system comprising a set of type-bars 7 adapted to be swung upwardly and rearwardly against the front face of the platen 9 mounted on the carriage 4. The type-bars 7 carrying types 8 are operated by keys 10 on key levers 11 fulcrumed at 12 and connected through sub-levers 13 to the type-bars which are pivoted on the fulcrum rod 14.

The carriage is propelled in its letter-feed movement by a spring drum or motor 15 connected through a draw band 16 to a lug 17 on the carriage. When the carriage is in the zone of the type set on frame 1, its letter-feed movement is controlled by a rack 18 on the carriage, running in mesh with a pinion 19 connected to an escapement wheel 20 controlled by escapement dogs 21 on a rocker 22, the latter actuated by a universal bar 23 to which movement is imparted by heels 24 on the type-bars. The rack 18 forms part of a frame 25 pivoted on the carriage at 26, which frame may be operated by a finger-piece 27 to lift the rack and release the carriage from the escapement mechanism and permit the carriage to run forward.

The carriage, when released by the key 27 may be moved along the rails 5 and 6 into a position to coöperate with the type system comprising keys 10ª operatively connected to types 8ª on the frame 2. The letter-feed movement of the carriage when in such position is controlled by a mechanism similar to that just described, and which may comprise a rack 28 to run in mesh with a pinion 29 connected to an escapement wheel 30, controlled by escapement dogs on a rocker 31, actuated by the type-bars on the frame 2.

It will be noted that the escapement pinion 29 is of greater diameter than the escapement pinion 19 on the frame 1, whereby the letter-feed movements of the carriage when opposite the types 8ª on the frame 2 are of greater extent than those for the types 8 on the frame 1, thus providing for different sized types in the two type sets. The difference in letter-spacings for the two type systems could be provided in various other ways, as for example, by varying the relative number of teeth on the escapement wheels 20 and 30, or making the spacings of the teeth on one of the racks 18 and 28, greater than on the other. The letter-spacings for the two systems might also be made equal if desired, in which case a single letter-feed rack on the carriage would preferably be employed.

The mechanism which may serve the purpose of the usual tabulator mechanism employed on the Underwood machine, and which may further be used for shifting the carriage from one type system to the other and bringing it to rest at any column or letter-space position for the type system to which it is shifted, will now be described.

On the machine frame 1 is mounted a swinging rack frame comprising a lower horizontal bar 32, a rack bar 33, and ends 34 and 35, said frame provided with pivots 36 and 37 by which the rack frame is mounted on the machine frame 1. The pivot 36 may have its bearing in a block 36ª, secured to the frames 1 and 2. Column stops 38 slidably mounted on a rod 39 of the rack frame, are provided with teeth adapted to interlock with the teeth 40 on the rack 33 to hold the stops in any position of adjustment along the rack, and each stop is provided with a forwardly extending lug or projection 41 which, when the rack frame is swung forward, is in the path of a stop 42 on the carriage.

The rack frame is swung forward to operative position by means of a tabulator key 43 on a lever 44 fulcrumed at 12 and connected through a link 45, to an arm 46 on the rack frame. When the tabulator key is depressed the carriage feed rack 18 is lifted from the pinion 19 to release the carriage from the letter-feed escapement mechanism by means of a roller 47 on a lever 48 pivoted at 49, and actuated by a lug 50 projecting forward from the rack frame. Thus when the tabulator key 43 is depressed the stops 38 are swung forward and the carriage released and permitted to be drawn forward by the motor 15 until the first stop 38 in the path of the lug 42 arrests the carriage.

Similar tabulator mechanism may be provided on the frame 2; such mechanism, comprising a frame consisting of bars 51 and 52 connected by ends 53 and 54 having pivots 55 and 56. Stops 57 are adjustable along the rack bar 51. It will be noted that the teeth on the rack 51 are spaced at wider intervals than the teeth on the rack 33, the spacing in each instance being preferably the same as that of the letter-space feed of the carriage. Each of the stops 38 and 57 is preferably provided with a pointer 58 to indicate on a scale as 59, the letter-space position at which the carriage may be arrested by the stop.

In order that the carriage may be shifted from one type zone to the other by the operation of the tabulator key 43 and be arrested in any desired position, determined by the setting of a stop 57, the two rack frames are connected to swing the unit. For this purpose, a connection, as shown in Figs. 2 and 3, may be provided; such a connection comprising a rod 60 having a stem 61 threaded into a hollow rod or sleeve 62, the rod 60 connected to the frame end 53 by a screw 63, and the rod 62 connected to the frame end 34 by a screw 64. An adjustable but rigid connection between the frames is thus provided, whereby when either rack bar is swung forward by the operation of a tabulator key, the other rack bar swings with it.

The rack-frames, being rigidly connected and concentrically hinged, may be adjusted endwise simultaneously by suitable manipulation of the pivot screws 37, 56, at the ends of such double rack-frame; and if it be found that either rack-frame is out of its true relationship to the escapement mechanism associated therewith, its pivot screw (37 or 56) may be adjusted or retracted, and the other of the pivot screws adjusted accordingly. The pivots 36, 55 can slide in their bearings to permit this adjustment; such sliding of a rack-frame pivot being well-known in the Underwood machine. If it is found that when one rack-frame is properly adjusted with relation to its associated escapement devices, the other rack-frame is thrown out of adjustment, then the part 60 may be adjusted or retracted relatively to the part 62, so as to either separate the frames more or draw them together a little, in order to make the necessary correction in the position of one of the rack-frames; whereupon the screw pivot 37 or 56 may be adjusted or retracted accordingly; whereby the entire device may be positioned to accord with the two letter-feeding mechanisms.

It will thus be seen that if the tabulator key 43, for example, be depressed while the carriage is in the position shown, the carriage will be released from the control of the escapement mechanism 22, Fig. 1, and permitted to run forward into the zone of the type system on the frame 2. The rack 51 on the frame 2 will also be swung forward and hold the letter-feed rack 28 off the escapement pinion 29 so that the carriage can continue its forward movement until arrested at a predetermined position by a stop 57 on the rack 51. The letter-feed racks on the carriage may be of sufficient length to be engaged by both rollers 47 as the carriage passes from one printing zone to the other, thus preventing the feed racks from dropping at this point. The arrangement just described for shifting the carriage from one printing zone to the other is of great convenience for tabulator work in which one or more columns in the work-sheet are adapted to be written by one set of types and other columns by a different set of types. The stops 38 may be adjusted for bringing the carriage to different column positions for writing tabulator work along the left-hand side of the work-sheet, and the carriage then shifted by operating the key 43, for writing with a different set of type in other columns along the right-hand side of the sheet. In some kinds of work the tabulator stops 38 may be set to in-operative position and the key 43 used simply for shifting the carriage from one type zone to a predetermined position in the other type zone. Thus, part of a line may be written with one set of types and the key 43 then depressed to position the carriage for completing the line with the other set of types. A tabulator key 65 is preferably provided on the frame 2. Either key 43 or 65 may be used to actuate the tabulator rack bars.

Variations may be resorted to within the scope of the invention, and portions of the improvements may be used without others.

Having thus described my invention, I claim:

1. In a typewriting machine, the combination with a plurality of type sets, of a rack bar associated with each type set, stops adjustable along the rack bars, and a key connected to operate both of said rack bars.

2. In a typewriting machine, the combination of a plurality of type systems, a carriage movable into coöperative relation to either system, tabulator stops for each type system, a tabulator key, and means operated thereby for operating the stops for both type systems.

3. In a typewriting machine, the combination with machine frames, of a tabulator rack on each frame, stops on said racks, means connecting said racks for operation as a unit, and a key to operate said racks.

4. In a typewriting machine, the combination with machine frames, of a stop frame on each of the machine frames, stops adjustable along the stop frames, means forming a rigid connection between said stop frames, a key, and operating connections between the key and said frames.

5. In a typewriting machine, the combination with a plurality of type sets, of a carriage shiftable into operative relation to either type set, a separate escapement mechanism for each type set, tabulator stops for the carriage when in operative relation to either type set, and a key controlling said stops.

6. In a typewriting machine, the combination with a plurality of type sets, of a traveling carriage shiftable into coöperative relation with either type set, tabulator stops for stopping the carriage at different positions when in relation to one type set, a key, and means operated thereby to release the carriage when in the zone of the other type set and permit it to move into position to be arrested by said stops.

7. In a typewriting machine, the combination with a plurality of type systems, of a traveling carriage movable into position to coöperate with either type system, letter-feeding devices for controlling said carriage when coöperating with said type systems, a key, and means controlled by said key for releasing the carriage and moving it from one type system to the other.

8. In a typewriting machine, the combination with a plurality of type systems, of a carriage movable into coöperative relation to either type system, letter-feeding devices for controlling said carriage when coöperating with said type systems, an adjustable stop, a key, and means controlled by the key for releasing the carriage and causing it to move out of the zone of one type system into a position determined by the adjustment of said stop in the zone of the other type system.

9. In a typewriting machine, the combination with a plurality of type systems, of a traveling carriage shiftable into coöperative relation to either type system, a motor to drive the carriage, devices to control the letter-feed movements of the carriage when coöperating with said type systems, a key, and means operated thereby to release the carriage and cause it to be driven from one type system into coöperative relation to the other type system.

10. In a typewriting machine, the combination with a plurality of type systems, of a traveling carriage shiftable into coöperative relation to either type system, a motor to drive the carriage, escapement devices to control the letter-feed movements of the carriage when coöperating with said type systems, a key, means operated thereby to release the carriage and cause it to be driven from one type system into coöperative relation to the other type system, and an adjustable stop controlled by said key for stopping the carriage.

11. In a typewriting machine, the combination with a plurality of type systems, of a traveling carriage movable into coöperative relation to either type system, letter-feeding devices for controlling said carriage when coöperating with said type systems, tabulator stops to arrest the carriage when in coöperative relation with either type system, and a tabulator key controlling said stops and connected to means to release the carriage.

12. The combination with a plurality of type systems, of a letter-feeding carriage shiftable from position to coöperate with only one of said type systems to a position to coöperate with only the other of said type systems, and tabulating devices including column-stops to coöperate with said carriage when it is coöperating with each of said type systems.

13. The combination with a plurality of type systems, of a letter-feeding carriage shiftable to coöperate with only one of said type systems to a position to coöperate with the other of said type systems, and tabulating devices for said carriage including two rack frames; one of said rack frames mounted to coöperate with the carriage when the latter is coöperating with one of said type systems, and the other of said rack frames mounted to coöperate with the carriage when the latter is coöperating with the other of said type systems.

14. The combination with a plurality of type systems, of a letter-feeding carriage shiftable in the general direction of letter-feeding from position to coöperate with only one of said type systems to a position to coöperate with the other of said type systems, and tabulating devices for said carriage, including two racks of different pitch and carriage stops adjustable along said racks; one of said racks mounted to coöperate with the carriage when the latter is coöperating with one of said type systems, and the other of said racks mounted to coöperate with the carriage when the latter is coöperating with the other of said type systems.

15. The combination with a plurality of type systems, of a letter-feeding carriage shiftable in the general direction of letter-feeding from position to coöperate with one of said type systems to a position to coöperate with the other of said type systems, tabulating devices for said carriage including two connected racks, and carriage stops adjustable along said racks, one of said racks associated only with one of said type systems, and the other of said racks associated only with the other of said type systems.

16. The combination with a plurality of type systems, of a letter-feeding carriage shiftable in the general direction of letter-feeding from position to coöperate with one of said type systems to a position to coöperate with the other of said type systems, tabulating devices for said carriage including two connected racks, carriage stops adjustable along said racks, one of said racks associated only with one of said type systems, and the other of said racks associated only with the other of said type systems, and means to effect fine relative adjustments between said racks in the direction of their length.

17. The combination with a plurality of type systems, of a letter-feeding carriage shiftable in the general direction of letter-feeding from position to coöperate with one of said type systems to a position to coöperate with the other of said type systems, tabulating devices for said carriage including two connected racks, carriage stops adjustable along said racks, one of said racks associated only with one of said type systems, and the other of said racks associated only with the other of said type systems, and means to effect endwise adjustment of said racks; the connection between the latter being rigid.

18. The combination with a plurality of type systems, of a letter-feeding carriage shiftable in the general direction of letter-feeding from position to coöperate with one of said type systems, to a position to coöperate with the other of said type systems, tabulating devices for said carriage including two connected racks, carriage stops adjustable along said racks, one of said racks associated only with one of said type systems, and the other of said racks associated only with the other of said type systems, and means to effect endwise adjustment of said racks; the connection between the latter being rigid, and including means to effect fine relative adjustments between the racks.

19. In a typewriting machine, the combination with a plurality of type sets, of a carriage shiftable to bring either type set into use, letter-feeding mechanism for said carriage, a rack-bar associated with each type set, tabulating stops adjustable along the rack bars, and means to effect the release of the carriage from the letter-feeding mechanism and the arrest of the carriage by the tabulating stops.

20. The combination with a plurality of type sets, each operable independently of the other, of a paper carriage shiftable from one type set to the other, and a tabulating mechanism extending along the run of the carriage to coöperate therewith when it is positioned for coöperation with either one of said type sets.

21. In a typewriting machine, the combination with a plurality of type sets, of a carriage shiftable to enable either one set or the other to be brought into use, a separate carriage escapement mechanism associated with each type set, tabulator stops for arresting the carriage when either type set is in use, and means for releasing the carriage and bringing the tabulator stops into use to arrest the same.

22. In a typewriting machine, the combination with a plurality of type sets, of a letter-feeding carriage shiftable in general letter-feeding direction from one type set to the other, a spring to drive said carriage throughout its range of travel, tabulating mechanism including means to release the carriage when coöperating with each of said type sets, and means to arrest the carriage upon such release.

FRANK C. URSBRUCK.

Witnesses:
E. A. RENNIE,
F. E. ALEXANDER.

Copies of this patent may be obtained for five cents each, by addressing the "Commissioner of Patents, Washington, D. C."